July 30, 1968  E. BUSTAMANTE ET AL  3,394,458
HIGH TORQUE HANDPIECE
Filed April 5, 1963  3 Sheets-Sheet 1
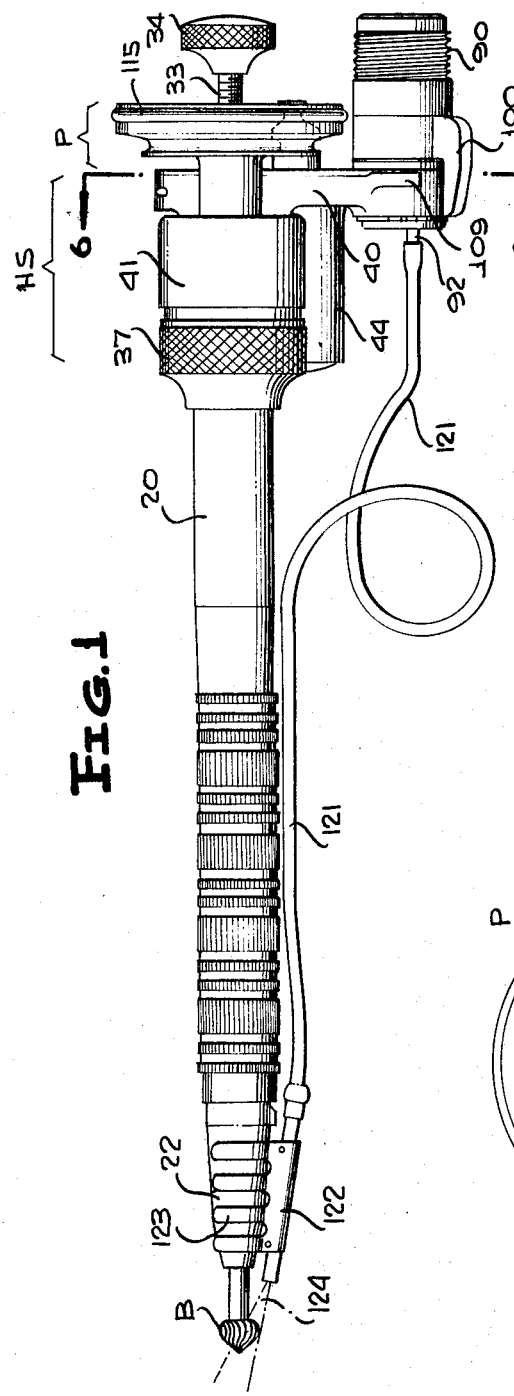
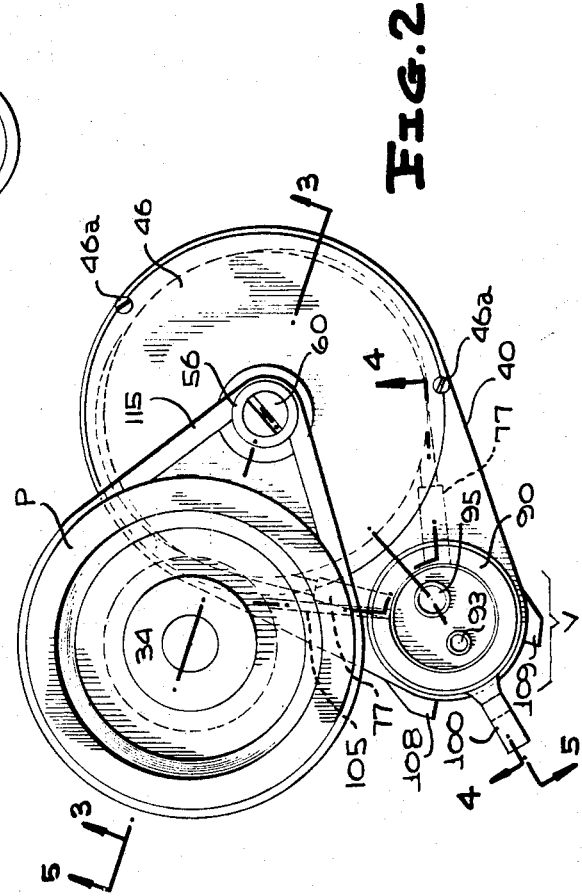
INVENTOR
ERNEST BUSTAMANTE
& RAYMOND L. FLATRAY
BY Mason, Porter, Diller & Stewart,
ATTORNEYS

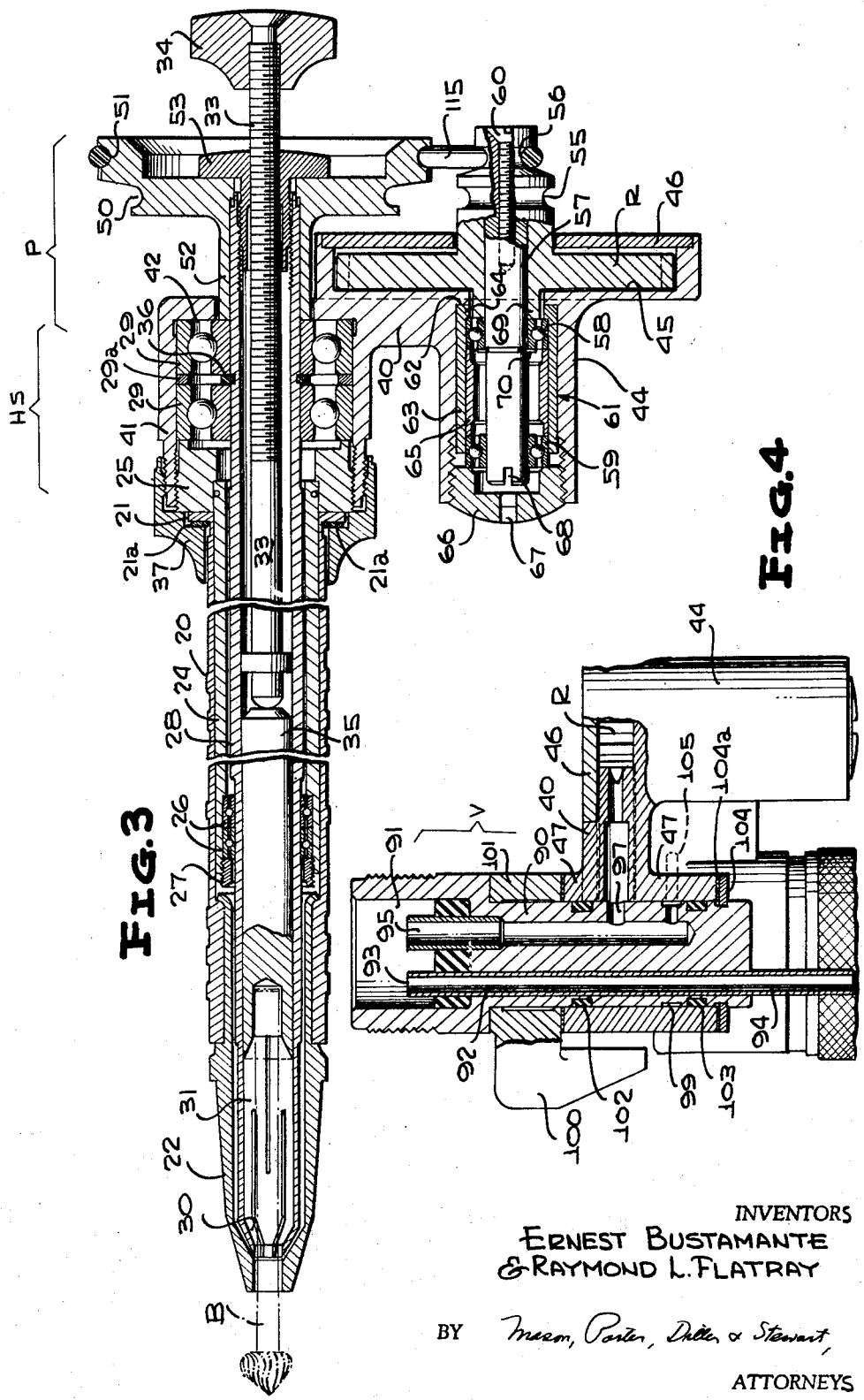

July 30, 1968  E. BUSTAMANTE ET AL  3,394,458
HIGH TORQUE HANDPIECE
Filed April 5, 1963  3 Sheets-Sheet 3
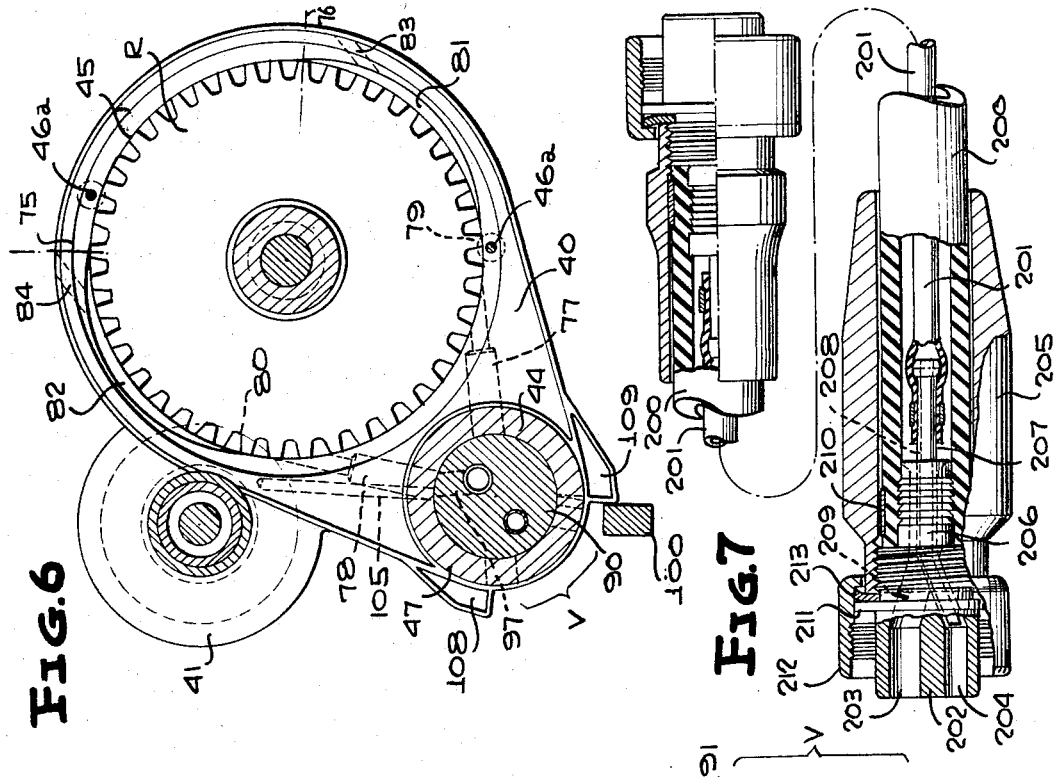
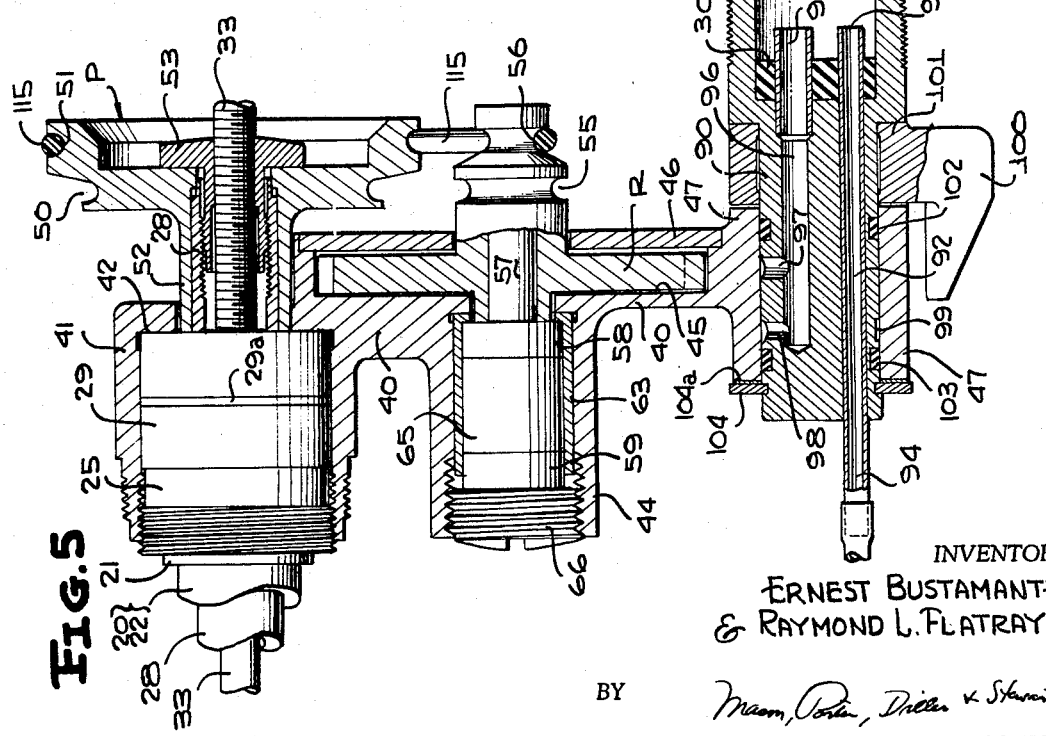
INVENTORS
ERNEST BUSTAMANTE
& RAYMOND L. FLATRAY
BY
ATTORNEYS United States Patent Office 3,394,458
Patented July 30, 1968

3,394,458
HIGH TORQUE HANDPIECE
Ernest Bustamante and Raymond Leonard Flatray, Denver, Colo., assignors, by mesne assignments, to Pennsalt Chemicals Corporation, Philadelphia, Pa., a corporation of Pennsylvania
Filed Apr. 5, 1963, Ser. No. 271,021
10 Claims. (Cl. 32—28)

This invention relates to an air-driven handpiece for dental and like employments, and is particularly concerned with such a device in which a high torque can be employed at the bur, grindwheel, or other tool.

One object of the invention is the provision of a high speed air rotor, with a speed-reduction and torque-multiplying drive therefrom.

Another object is the provision of a high speed air rotor on a handpiece, with means on the handpiece for reversing the direction of rotation.

Another object is the provision of a head structure including a high speed air rotor, connections for handpiece sleeves, and a torque-multiplying drive between the rotor and a rotatable sleeve of the handpiece.

Another object is the provision of a head structure including an air rotor, connections for handpiece sleeves, and a valve by which the flow of air can be controlled to cause movement of the air rotor in one or the other direction, and preferably with means for supplying plenum air into the sleeves.

Another object is the provision of a head structure including an air rotor, and a unit-type bearing assembly for the rotor which can be inserted in and removed from the head structure.

Another object is the provision of a head structure including an air rotor, and a valve for controlling the same, the valve including a part rotatable in the head structure and having upon itself means for connection to the source of compressed air.

Another object is the provision of a head structure and a valve body rotatable in said head structure for controlling air flow to an air rotor; said valve body having thereon means for connection to a source of compressed air and a source of water, and effective for the flow of air to the rotor and for the flow of water to a jet nozzle adjacent the tool being driven by the rotor.

A further object is the provision of a structure in which the compressed air employed for driving the air rotor can be used as carrier for a lubricant and this lubricant delivered to the relatively rotating internal surfaces of the structure.

With these and other objects in view, as will appear in the course of the following description, an illustrative embodiment is shown on the accompanying drawings, in which:

FIG. 1 is a side view of handpiece with the high torque device according to this invention;

FIG. 2 is an end view of the same, at a larger scale;

FIG. 3 is a longitudinal section substantially on line 3—3 of FIG. 2;

FIG. 4 is a fragmentary section substantially on broken line 4—4 of FIG. 2;

FIG. 5 is a fragmentary section substantially on broken line 5—5 of FIG. 2, with parts broken away and omitted;

FIG. 6 is a transverse section substantially on line 6—6 of FIG. 1;

FIG. 7 is a connecting hose, shown partly in longitudinal section.

It is known to employ compressed air as a driving medium for an air rotor in a dental handpiece. Lubrication of high speed devices having closely fitting parts is desirable, and the present structure is adapted to be driven by compressed air, in which the air stream carries particles or a mist of lubricant such as an oil, and includes passages whereby such air is caused to move past and through such bearings for assuring the lubrication thereof.

In the illustrative embodiment, a standard handpiece structure is shown, comprising the outer sheath or sleeve 20 having (FIG. 3) a radially outward flange 21 at one end and supporting a nose piece 22 at the other end. An inner sleeve 24 is fixed to a collar 25 adjacent flange 21, and supports antifriction bearings 26 adjacent the nose piece 22 which are held in place by a hollow nut 27. A rotatable tool supporting shaft or sleeve 28, within the sleeve 24, is supported by the antifriction bearings 26 and by larger antifriction bearings 29 within the head structure HS set out hereinafter. A spacer 29a is present between the outer races of the bearings 29. The shaft or sleeve 28 has an inwardly convergent cone wall 30 within the nose piece 22 for receiving the split chuck 31 which in turn holds the working bur B.

The chuck is clamped upon the bur by the action of the threaded stem 33 having a hand knob 34 fixed thereon for rotating the stem and causing it to move axially in an internally threaded pulley member P and thus exert thrust upon the link rod 35 located in the sleeve 28 and having its end engaged with the chuck 31 whereby to force the latter to the left in FIG. 3 and cause the chuck to be compressed by the cone wall 30 to grip the bur.

A split ring 36 in a peripheral groove in the rotatable sleeve 28 engages the inner race of a bearing 29 and cooperates with the hollow stem 52 of the pulley structure P to restrict axial movement of the sleeve 28. A clamp nut 37 surrounds the sheath 20 and is threadedly engaged on a projection 41 of the head structure. A spring washer 21a is present between the nut 37 and the flange 21 so that the sheath 20 and flange 21 may be held or rotated while the nut 37 is being threaded to position. The collar 25 in turn is threaded into the head structure projection 41 and against the outer race of an antifriction bearing 29.

In the illustrative embodiment, the head structure shown generally as HS in FIG. 1 has an integral metal body with a web 40 having a hollow cylindrical projection 41 onto which the nut 37 and into which the collar 25 are threaded. The shoulder 42 inside projection 41 supports the outer race of a bearing 29 against the thrust of the collar 25, acting through the outer race of the other bearing 29 and the spacer 29a between these races. A second projection 44 from the web 40 extends parallel to projection 41 and therewith parallel to the axis of the handpiece sleeves and the threaded stem 33. Coaxial with the projection 44, the web 40 has a cylindrical cavity 45 for the rotor R set out hereinafter: a cover plate 46 is secured over the cavity, e.g., by a screw 46a. An aligned third projection 47 extends from the web 40 parallel to the handpiece axis.

The pulley structure P comprises two track portions or grooves 50, 51 of different diameters, and a hollow stem 52 which fits closely over the end of the rotatable sleeve 28. A hollow screw 53 is threadedly engaged at its outer surface in the sleeve 28 and is threaded internally to receive the threaded stem 33. The stem 52 illustratively extends through a hole in the web 40 and engages the inner race of the adjacent bearing 29, so that tightening the screw 53 clamps the parts.

The fluid-driven rotor assembly comprises (FIGS. 3, 6) the rotor R proper with an integral axial extension having two track portions or grooves 55, 56 respectively in axial planes with the grooves 50, 51 on the pulley structures P: the rotor shaft 57 and antifriction bearings 58, 59 therefor; and a screw 60 which has a head engaged with the end of the rotor extension, and a stem threaded into the rotor shaft 57 and effective for binding the rotor and shaft together. The shaft 57 extends into the rotor extension. The projection 44 of the web 40 has a cavity with a cylindrical wall portion 61 having a shoulder wall 62: a sleeve 63 is received by the walls and has an inward flange 64 adjacent wall 62. The outer races of the bearings 58, 59 are lightly pressed into the sleeve 63, with the spacer 65 present between the outer races and fitting the sleeve 63. A screw 66 is threaded into the end of the projection 44 and bears against the outer race of bearing 59 and thus serves to clamp the assembly of bearings and spacer against the flange 64, and this flange against the shoulder wall 62, so the parts are fixed in position. A small axial aperture 67 is provided in the screw 66 to provide a bypass air current to flow from the rotor cavity 45 through the bearings 58, 59, carrying lubricant with it for lubricating these bearings. The shaft 57 is held against movement relative to the inner race of bearing 58 by a split ring 70 engaged in a peripheral groove of the shaft. This assembly of parts permits removal and replacement of the bearing assembly of the shaft 57, the bearings 58, 59, spacer 65, and the sleeve 63 essentially as a preassembled unit and prevents wear of the cavity walls which would be destructive of accuracy. With the screw 66 removed, the assembly can be pushed into place, and the rotor R passed onto its end within the cavity 45. The screw 60 is engaged through the rotor R and into shaft 57 and the parts drawn tight, noting the kerf in the screw 60 and the kerf 68 in shaft 57, and wherewith the flange or collar 69 on the rotor R is pressed against the inner race of bearing 58, and the bearing in turn is pressed against the split ring 70.

The rotor R (FIGS. 3, 4, 5 and 6) is illustratively of aluminum alloy and can be about ⅛ inch thick by about 1¼ inches in diameter, formed with 40 equally spaced teeth in its periphery: the teeth having plane walls symmetrical relative to the respective radial plane of a tooth gap and at 60 degrees relative to one another. The roots of the tooth gaps are rounded and at about 9/16 inch radial distance from the rotor axis. It has been found that these dimensions give easy starting and excellent torque in either direction for the illustrated embodiment.

The cavity 45 in the web 40 has a peripheral wall between points 75, 76 which closely fits the periphery of the rotor, this wall portion being opposite the valve body V described in detail hereinafter. Two inlet passages 77, 78 lead from the valve body to the cavity 45, with their axes directed tangentially to the circle of tooth gap roots on the rotor and symmetrically spaced from the radial plane through the axes of the rotor R and the valve V, therewith having their mouths or nozzle ends as ellipses on the periphery of the cavity and positioned respectively about 52½ degrees from the said symmetry plane. The peripheral wall portion of the cavity between points 79, 80 and diametrically opposite the portion between points 75, 76 is also preferably close to the periphery of the rotor R. Between points 79 and 76, and between points 80, 75, the peripheral wall portions are formed as arcs which provide expansion and escape pockets 81, 82 at the periphery of the rotor R. Escape holes or vents 83, 84, lead from these pockets through the web wall and to the atmosphere.

The valve V (FIGS. 4, 5 and 6) is formed as a unit with the connection to the pressure fluid for driving the rotor R. A metal body 90 closely fits in a bore that extends through the web 40 and its projections 47, and has a cavity 91 at its outer end, this end being threaded at the exterior. A water duct 92 is tightly fitted in the body, in a hole parallel to and spaced from the body axis: the duct 92 has one end 93 exposed in cavity 91 and the other end 94 projecting from the end of the body. An air tube 95 is tightly fitted and sealed at the outer end of a bore 96: the tube 95 is partly exposed in the cavity 91. A first port 97 leads from the bore 96 to the periphery of the body 90. A second port 98 leads therefrom for communication with a peripheral groove 99 in the body. A valve handle or ear 100 is integral with a portion 101 which is force-fitted on the body for rotating the same about its axis. Sealing rings 102, 103 are provided in peripheral grooves of the body 90, to seal the same relative to the wall of the bore through web 40 and projection 47. A snap ring 104 fits a peripheral groove of the body 90 and bears on a friction washer 104a engaging the end of projection 47 and cooperating with the engagement of the handle portion 101 against the web 40 to prevent axial movement of the body 90 while permitting rotational adjustment thereof.

A passage 105 in the web 40 leads from the valve receiving bore in this body, for communication between the groove 99 and the interior of the projection 41 for establishing a plenum condition within the handpiece sleeves 20, 24. Ears 108, 109 on the web 40 (FIGS. 2 and 6) provide stops for limiting the rotational movements of the handle 100 and therewith of the body 90, so that in the end positions the passage 97 is aligned with the respective nozzle ducts 77, 78 with a stoppage of air flow therethrough when the handle 100 is in a middle position.

The rotor R and the pulley structure P are in driving relation by a belt 115 which can be of rubber and of circular section as shown in FIG. 3. When this belt is in tracks 56, 51, the driving reduction and torque increase can be in the ratio of about 6:1; when in the tracks 55, 50, the ratio can be 3:1. In either position, the speed of the rotor R can be determined by the pressure of the air delivered to the fluid connection 95 and thus through a nozzle duct 77 or 78 and this in turn can be controlled by the dentist by a foot-actuated valve (not shown) which can be of the usual type.

When the handle 100 is in the counterclockwise end position shown in FIG. 6, the air from port 97 in the body 90 is delivered through the nozzle duct 78, and the rotor R is driven in a clockwise direction, and the sleeve 28 of the handpiece is driven in the same direction for cutting with the customary right-hand burs. With the belt in tracks 55, 50, no-load speeds of the tool from zero to 23,000 r.p.m. can be attained by the foot control valve with the illustrative embodiment: when the belt is in tracks 56, 51, no-load speeds from zero to about 10,000 r.p.m. are available. Each speed under load is at a torque three or six times greater than attainable by the rotor R: and hence the tool is excellently adapted even for the high-load work in preparing and cleaning dental plates, inlays, and the like work in the dental laboratory. During such work, air carrying lubricant moves through the passage 105 to the interior of the projection 41 so that the bearings 29 and 26 receive lubrication, and a plenum is established in the handpiece sleeves, for preventing the entry of chips and dust, and effective for blowing such away from the site at which work is performed.

The dentist also can direct a stream of laving and cooling water upon the site, by opening the usual water valve (not shown) so that water flows through the duct 93, 92, 94 and the hose 121 (FIG. 1) to the nozzle piece 122 held to the handpiece by clip 123, so that a jet 124 is delivered to the selected spot.

By moving the handle 100 to central position, the dentist can stop the rotation independently of any other air control.

By moving the handle 100 to the extreme clockwise position, the port 97 of the valve V is brought to alignment with the nozzle duct 77, and the rotor R and the handpiece stem 28 are driven in a counterclockwise direction, so that the technican can operate a grinding wheel, for example, in either direction and at like speeds, by a simple movement of the handle 100.

The illustrative sleeve structures and the clamp nut 37 are shown as standard parts now ued by dentists. They can be removed as usual for cleaning and sterilization; and can be replaced by other standard parts such as straight or contra-angle structures.

The pressure fluid and water can be delivered to the handpiece by a flexible hose assembly as shown in FIG. 7. An outer flexible rubber tubing 200 is provided which is adequate to resist the usual internal air pressure of say 50 pounds per square inch.

Within the tubing 200 is a smaller flexible water duct 201 which provides an annular air space around it, and is resistant to collapse by the air pressure. At the end for connection to the body 90, the hose assembly has a metal plug 202 for entering the cavity 91 (FIG. 4) and having two openings 203, 204 for respectively fitting over the air tube 95 and the end 93 of the water duct 92. A rubber washer 301 having apertures closely fitting the water duct 92 and the air tube 95 is located in the bottom of cavity 91: when the parts are brought together with the end face of the plug 202 pressed against the washer 301, the water and air connections are sealed. The inner or right hand end of the plug 202 (FIG. 7) has a threaded end for receiving a stiffener 205 around the end of the tubing 200; a second projection 206 with peripheral ribs for tightly fitting in the tubing 200 and sealing the same, and a third projection 207 for likewise receiving and sealing the water duct 201. The projection 207 has a passage 208 therein which leads to the water opening 204. The projection 206 has a pasage 209 therein which leads to the air connection 203. A clamping sleeve 210 binds the tubing 200 onto the projection 206. The plug 202 has a peripheral flange 211. An internally threaded clamp nut 212 can engage the external threads on the body 90 and act through a dished spring 213 to hold the plug 202 in the cavity 91 and in the aforesaid sealing relation with the rubber washer 301.

In practice, using air at about 30 p.s.i., in quantity of 1.7 to 1.9 cubic feet per minute, which are available from standard dental laboratory pumps, the rotor can be driven at 60,000 r.p.m. without load and for long periods; and the speed can be controlled by a foot-actuated valve as usual.

The compressed air for driving the rotor can be supplied with lubricating oil in the course of its movement to the connection 95, and carries this lubricant as a mist and delivers this lubricant to the bearings in the headpiece and its attachments.

The illustrative embodiment is not restrictive, and the invention can be employed in many ways within the scope of the appended claims.

What is claimed is:

1. A handpiece for rotary tools comprising a head structure, a sleeve fixed thereto, a tool supporting shaft rotatable in said sleeve and having a first pulley thereon, an air rotor mounted on the head structure for rotation about an axis parallel to that of the tool supporting shaft and having a second pulley thereon, a valve movable in the head structure for controlling movement of air to said air rotor and having a port, conduit means connecting said port to the interior of the sleeve for establishing a plenum therein, and a belt connecting the pulleys.

2. A handpiece for rotary tools comprising a head structure, a tool supporting shaft rotatable in said head structure, said head structure having a hollow extension with a shoulder, a sleeve fitted in the hollow of said extension to bear against said shoulder, and having a flange at the inner end of said sleeve, spaced antifriction bearings in the sleeve and a spacer between the outer races of said bearings, a rotor shaft, one end of said rotor shaft being mounted in said bearings, means on the shaft to engage a said bearing and hold the same against the flange, a rotor mounted on the other end of said shaft, and driving means connecting said rotor and said tool supporting shaft.

3. The handpiece of claim 2, and including a member threadedly engaged with said extension and engaged with the outer race of a said antifriction bearing for holding the outer races and spacer pressed against said flange.

4. A handpiece for rotary tools comprising a head structure, a tool supporting shaft rotatable in said head structure, an air rotor on said head structure, driving means for connecting the air rotor and tool shaft, a valve body rotatable in the head structure and having two longitudinal passages, means on the valve body for connecting the same to a plural conduit for delivering air and water to the respective passages, said valve body having a peripheral port from the air-connected passage, said head structure having a channel from the valve body to the rotor for delivery of air to the rotor in one rotated position of the valve body at which the said port is aligned with said channel, and a connection from the water-connected passage for delivering a jet of water toward a tool carried by the tool supporting shaft.

5. The handpiece of claim 4, including also a sleeve around the tool supporting shaft and a connection from the air-connected passage to the sleeve for establishing a plenum therein.

6. A handpiece for rotary tools, comprising a sleeve, a tool supporting shaft in said sleeve, spaced bearings in the sleeve to support the tool supporting shaft, a head structure connected to the sleeve and having a cavity, a rotary driving device located in said cavity, a bearing in said head structure for supporting said driving device, driving means connecting said driving device and said tool supporting shaft for rotating the latter, and a connection by which compressed air carrying lubricant is delivered into said cavity, said head structure having a passage leading from said connection to the interior of said sleeve whereby the lubricant in the air stream is delivered to said bearings for the tool supporting shaft and the driving device.

7. The handpiece of claim 6, in which the rotary driving device is an air rotor, and in which said connecton includes a valve body movable in the head structure, the valve body having a passage for receiving the compressed air and a first port, the head structure having a channel leading from the valve body to the cavity and effective when the first port is aligned with said channel for delivering the air to said air rotor, the valve body having a second port and the said passage extending from said second port to the interior of said sleeve.

8. A handpiece for rotary tools, comprising a head structure having two bore holes with parallel axes, a tool supporting shaft journalled to rotate in a first of said bore holes, a driving shaft in the second of said bore holes, a sleeve in said second bore hole and having an internal flange, an internal flange in said second bore hole, spaced antifriction bearings in said sleeve for mounting the driving shaft having inner and outer races, means on the driving shaft for limiting the relative axial movement of the inner race on one of said bearings, the head structure having a cavity at one end of the second bore hole, a rotor member on said driving shaft and in said cavity and having an axial flange engaged with the inner race of one said bearing, a screw threadedly engaged in the shaft and engaging the rotor member for clamping the inner race of said one bearing between said limiting means and said flange and for holding said sleeve flange against said bore hole flange, a threaded device in said second bore hole at the end remote from the rotor member for engaging the outer race of the other said bearing, and a driving connection between said rotor member and said tool supporting shaft.

9. The handpiece as in claim 8, in which the head structure has a third bore hole, and a member movably mounted in said third bore hole for controlling the delivery of energy to said rotor member.

10. The handpiece as in claim 9, in which the rotor member is air driven, and the member in said third bore hole is a valve for controlling air flow to said rotor member, and in which an air escape is provided from said second bore hole to the atmosphere at a point beyond the part of the second bearing which is remote from the rotor member whereby air can flow from the cavity through the antifriction bearings and to the air escape.

References Cited

UNITED STATES PATENTS

| | | | |
|---|---|---|---|
| 647,265 | 4/1900 | Hoff | 253—2 |
| 1,384,975 | 7/1921 | Shelton | 32—26 |
| 2,073,704 | 3/1937 | Mitchell | 32—26 |
| 3,046,585 | 7/1962 | Ledingham et al. | 253—2 |
| 3,101,541 | 8/1963 | Hoffmeister. | |

FOREIGN PATENTS 837,789   5/1952   Germany.

LOUIS G. MANCENE, *Primary Examiner.*

C. R. WENTZEL, *Assistant Examiner.*